(12) United States Patent
Hoarty

(10) Patent No.: US 9,190,052 B2
(45) Date of Patent: *Nov. 17, 2015

(54) SYSTEMS AND METHODS FOR PROVIDING INFORMATION DISCOVERY AND RETRIEVAL

(71) Applicant: W. Leo Hoarty, Morgan Hill, CA (US)

(72) Inventor: W. Leo Hoarty, Morgan Hill, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/512,568

(22) Filed: Oct. 13, 2014

(65) Prior Publication Data

US 2015/0032453 A1    Jan. 29, 2015

Related U.S. Application Data

(63) Continuation of application No. 13/951,083, filed on Jul. 25, 2013, now Pat. No. 8,862,615, and a continuation of application No. 12/269,718, filed on Nov. 12, 2008, now Pat. No. 8,521,766.

(60) Provisional application No. 60/987,368, filed on Nov. 12, 2007, provisional application No. 61/113,657, filed on Nov. 12, 2008.

(51) Int. Cl.
| | |
|---|---|
| G06F 7/00 | (2006.01) |
| G06F 17/30 | (2006.01) |
| G10L 15/08 | (2006.01) |
| G10L 15/22 | (2006.01) |
| G10L 15/00 | (2013.01) |

(52) U.S. Cl.
CPC .......... *G10L 15/08* (2013.01); *G06F 17/30023* (2013.01); *G06F 17/30752* (2013.01); *G10L 15/005* (2013.01); *G10L 15/22* (2013.01)

(58) Field of Classification Search
None
See application file for complete search history.

(56) References Cited

U.S. PATENT DOCUMENTS

| | | | | |
|---|---|---|---|---|
| 5,719,921 | A | * | 2/1998 | Vysotsky et al. .......... 379/88.01 |
| 6,226,612 | B1 | * | 5/2001 | Srenger et al. ............. 704/256.2 |
| 7,899,669 | B2 | * | 3/2011 | Gadbois ........................ 704/235 |
| 2005/0038648 | A1 | * | 2/2005 | Ju et al. ......................... 704/231 |

* cited by examiner

*Primary Examiner* — Uyen Le
(74) *Attorney, Agent, or Firm* — Puget Patent; Michael Gibbons

(57) ABSTRACT

This invention relates generally to software and computers, and more specifically, to systems and methods for providing information discovery and retrieval. In one embodiment, the invention includes a system for providing information discovery and retrieval, the system including a processor module, the processor module configurable to performing the steps of receiving an information request from a consumer device over a communications network; decoding the information request; discovering information using the decoded information request; preparing instructions for accessing the information; and communicating the prepared instructions to the consumer device, wherein the consumer device is configurable to retrieving the information for presentation using the prepared instructions.

20 Claims, 13 Drawing Sheets

US 9,190,052 B2

SYSTEMS AND METHODS FOR PROVIDING INFORMATION DISCOVERY AND RETRIEVAL

PRIORITY CLAIM

This present application constitutes a continuation of U.S. patent application Ser. No. 13/951,083, entitled SYSTEMS AND METHODS FOR PROVIDING INFORMATION DESCOVERY AND RETRIEVAL (our ref: AVGA-1-1003-1), naming W. Leo Hoarty as the inventor, filed Jul. 25, 2013, which is currently co-pending. This application Further constitutes a continuation of U.S. patent application Ser. No. 12/269,718, entitled SYSTEMS AND METHOUDS FOR PROVIDING INFORMATION DISCOVERY AND RETRIEVAL (our ref: AVGA-1-1001-1), naming W. Leo Hoarty as the inventor, filed Nov. 12, 2008and issued as U.S. Pat. No. 8,521,766 on Aug. 27, 2013. This application further claims the benefit of U.S. Provisional Application No. 60/987,368 filed Nov. 12, 2007 (our ref: AVGA-1-1001) and U.S. Provisional Application No. 61/113,657 filed Nov. 12, 2008 (our ref: AVGA-1-1001BkProv). The foregoing applications are hereby incorporated by reference in their entirety as if fully set forth herein.

FIELD OF THE INVENTION

This invention relates generally to software and computers, and more specifically, to systems and methods for providing information discovery and retrieval.

BACKGROUND

The Internet is rapidly becoming a prime medium for the distribution of all forms of digital entertainment. The content available online includes most of the published music catalog, millions of music videos, TV programs, feature films, and literally billions of short home videos. This media is available through a large number of online portals and web sites that act as content aggregators. However, each aggregator has its own rules, interface, and business model. As a result, a media consumer is forced to manage a complex set of differing interfaces and transaction decisions in order to access desired media and experience it on a device of their choosing. In contrast, an average TV viewer or radio listener uses a single simple interface to locate and select entertainment. Accordingly, it is currently challenging for a media consumer to quickly and intuitively search for, locate, retrieve, and display or play desired media.

Furthermore, in order to retrieve media, online portals and websites require that the media consumer precisely identify the desired media, such as by book title or artist name. However, it is often the case that a media consumer does not have this information and instead can only referentially identify desired media, such as an author's latest book, a song that contains certain lyrics, or a movie featuring a particular actor or actress. This type of request would be analogous to a hotel guest asking a concierge to fulfill a need without knowing where to look or even exactly what is being searched for. Oppositely to a hotel concierge, however, current online portals and websites would reject these search parameters or return useless information thereby resulting in consumer dissatisfaction. Accordingly, it is presently problematic for a media consumer to locate and acquire desired media when there is uncertainty over the precise identity of the media.

Additionally, online portals, websites, and other software applications present media using the traditional desktop file and folder or list paradigm thereby placing the burden on the media consumer to locate and identify desired media. A media consumer is not able to merely make a request for media and have that media delivered, but instead must expend effort to locate the desired media, which may or may not be embedded within a list of other presented media. Such file and folder or list arrangements have been useful in the past when displays were generous and the volume of information was manageable; however, this presentation method has become increasingly problematic as available media has exploded and device displays have become smaller. Accordingly, it is currently not possible for a media consumer to intuitively retrieve desired media by making intuitive requests.

The traditional computer keyboard has been established as an accepted substitute for natural language communication with a computer. Indeed, as computer devices have decreased in size, much creativity has been expended to similarly reduce the size of the keyboard. Personal digital assistants and phones are often now equipped with miniature finger sized keyboards and software that awkwardly assists in more quickly turning keystrokes into words. While natural language speech would be an easier and more instinctive way to communicate with computers, especially those that are smaller in size, current speech recognition systems are notoriously unreliable and limited in word-scope. This is especially true when speech is obscured by background noise, atypically pitched or accented, contains ambiguous terms, or involves proper names. Additionally, current speech recognition systems have difficulty when presented with proper names or words not found in a dictionary and adding all possible words overwhelms the accuracy of such systems. Furthermore, the speech recognition systems that offer the best results, while still very limited, require much more processing power than is available on a consumer computer or device. Accordingly, current consumer speech recognition systems do not serve as a viable substitute for the keyboard.

Although desirable results have been achieved, there exists much room for improvement. What is needed then are systems and methods for providing speech based media retrieval.

SUMMARY

This invention relates generally to software and computers, and more specifically, to systems and methods for providing information discovery and retrieval. In one embodiment, the invention includes a system for providing information discovery and retrieval, the system including a processor module, the processor module configurable to performing the steps of receiving an information request from a consumer device over a communications network; decoding the information request; discovering information using the decoded information request; preparing instructions for accessing the information; and communicating the prepared instructions to the consumer device, wherein the consumer device is configurable to retrieving the information for presentation using the prepared instructions. In an additional embodiment, the decoding the information request further includes performing speech recognition on the information request using CFG ASR that is assisted by SLM ASR. In a further embodiment, the performing speech recognition on the information request using CFG ASR that is assisted by SLM ASR further includes performing speech recognition on the information request using CFG ASR against a general grammar module to recognize at least one terminal; determining a context of the at least one terminal; performing speech recognition on the information request using CFG ASR against a grammar module defined by the context; and performing speech recognition on the information request using SLM ASR to supplement the speech recognition performed using CFG ASR.

BRIEF DESCRIPTION OF THE DRAWINGS

Embodiments of the present invention are described in detail below with reference to the following drawings.

DETAILED DESCRIPTION

Figure 1:
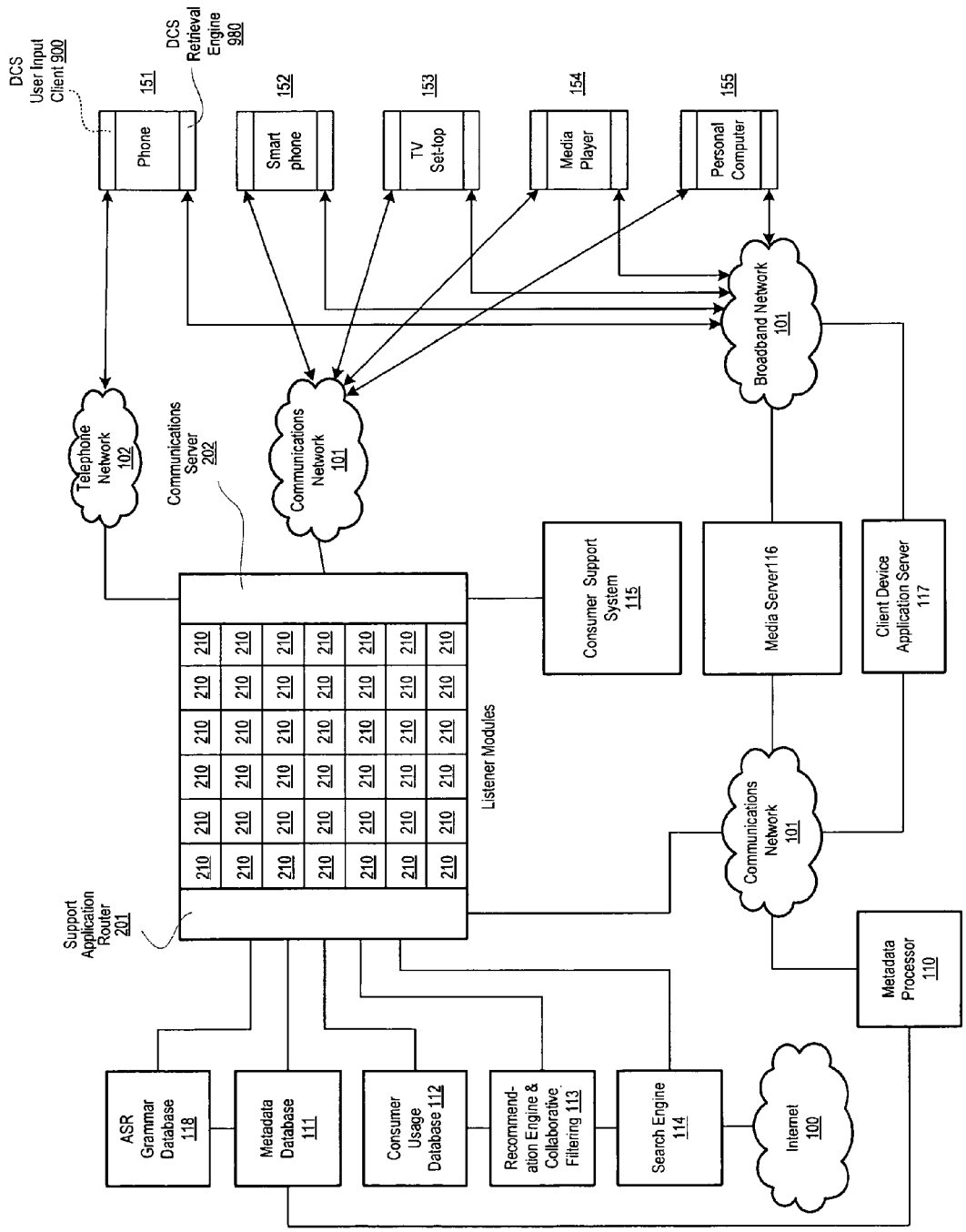
FIG. 1 is a system diagram of a multi-modal-consumer-input-based information discovery and retrieval system, in accordance with an embodiment of the invention.

This invention relates generally to software and computers, and more specifically, to systems and methods for providing information discovery and retrieval. Specific details of certain embodiments of the invention are set forth in the following description and in FIGS. 1-13 to provide a thorough understanding of such embodiments. The present invention may have additional embodiments, may be practiced without one or more of the details described for any particular described embodiment, or may have any detail described for one particular embodiment practiced with any other detail described for another embodiment.

Definition of Utterance. Utterance as used herein is intended to mean any audible speech or spoken word or words. However, an utterance can readily be substituted or complimented by motion communication, textual communication, graphical user interface interaction, or some other similar communication.

Definition of Media. Media as used herein is intended to mean any audio file, video file, image file, text file, or any combination of the foregoing. However, media is intended only as an example and can be readily substituted or complemented by any other information, such as that retrieved by first responders, military personnel, utility installers and repairmen, airplane pilots, scientists, business managers, lawyers, doctors, teachers, or any other similar information.

Definition of Media Request. Media request as used herein is intended to mean any request by a consumer for media. The media request includes an utterance and is configured to being packaged within a digital audio file. A media request is a specific type of information request that is presented herein for example only; accordingly, the invention is not to be limited to media requests as it is also applicable to any type of information request.

Definition of Context. Context as used herein is intended to mean any field of a media request, such as music, feature films, television shows, photography, podcasts, or other similar field. This usage of context is not to be confused with Context Free Grammar Automated Speech Recognition (CFG ASR), which is an industry term that references a particular type of speech recognition that recognizes words or phrases contained within lists. Statistical Language Model Automated Speech Recognition (SLM ASR) is another industry term that references a different type of speech recognition that recognizes phrases and combinations thereof after training. For clarity, CFG ASR and SLM ASR will be used herein to reference types of speech recognition and context will be used herein to reference a field of a media request.

Definition of Consumer Device. A consumer device as used herein is intended to mean a mobile phone, personal computer, laptop computer, personal digital assistant, smart phone, music player, television, radio, game console, video recorder, entertainment center, remote control, or any other similar device.

Definition of 'and' and 'or': The terms 'and' and 'or' as used herein are intended to mean either 'and' or 'or' or both 'and' and 'or'.

Any of the methods disclosed herein are configurable to being implemented using a software application. Any of the software applications disclosed herein are configurable to operating on one or more computing devices. Any of the methods, software applications, or computing devices disclosed herein can be combined, separated, omitted, or supplemented.

In one embodiment, the invention includes a server software application that is accessible via network communications by a client software application operating on a consumer device. Together, the client software application and the server software application cooperate to provide a system for locating and facilitating the delivery of desired media to the consumer device. The system recognizes and disambiguates unclear, incomplete, or inaccurate media requests received by the consumer device and translates those requests into content queries that are used to locate and provide access to the desired media.

FIG. 1 is a system diagram of a multi-modal-consumer-input-based information discovery and retrieval system, in accordance with an embodiment of the invention. In one embodiment, a client software application (FIG. 9) operates on a consumer device 152-155. A consumer device application server 117 is available to provide supporting applications to any of the consumer device 152-155, such as those to process and/or play or display media. The client software application is configurable to communicate with a communications server 202 via a communications network 101. Alternatively, a phone 151 is configurable to communicate with the communications server 202 via a telephone network 102. The communications server 202 is configurable to receive media requests from a consumer through the phone 151 or the consumer device 152-155 and may simultaneously receive media requests from a plurality of consumers. For example, the consumer can make a media request by uttering into the phone 151 or the consumer device 152-155, "Play the song Siempre Hay Esperanzia' by Sade." The media request is received by the phone or the consumer device 152-155 and is communicated to the communications server 202. In one particular embodiment, when using the consumer device 152-155, the media request is captured in a digital form and may be initialized to normalize volume, remove noise, perform bandpass filtering, perform file compression, or perform another similar function. In another particular embodiment, when using the phone 151, the media request is communicated to the communications server 202 where it may be similarly initialized. In a further particular embodiment, the media request is in the form of or includes text communication, motion, or graphical user interface interactions. Upon receiving the media request, or even upon initialization of the client software application, the communications server 202 is configurable to verify an identity of the consumer and any services available to the consumer using a consumer support system 115. The consumer support system 115 can access a consumer usage database 112 to retrieve the consumer's speech pattern characteristics, usage history, preferences, or other similar information.

Figure 3:
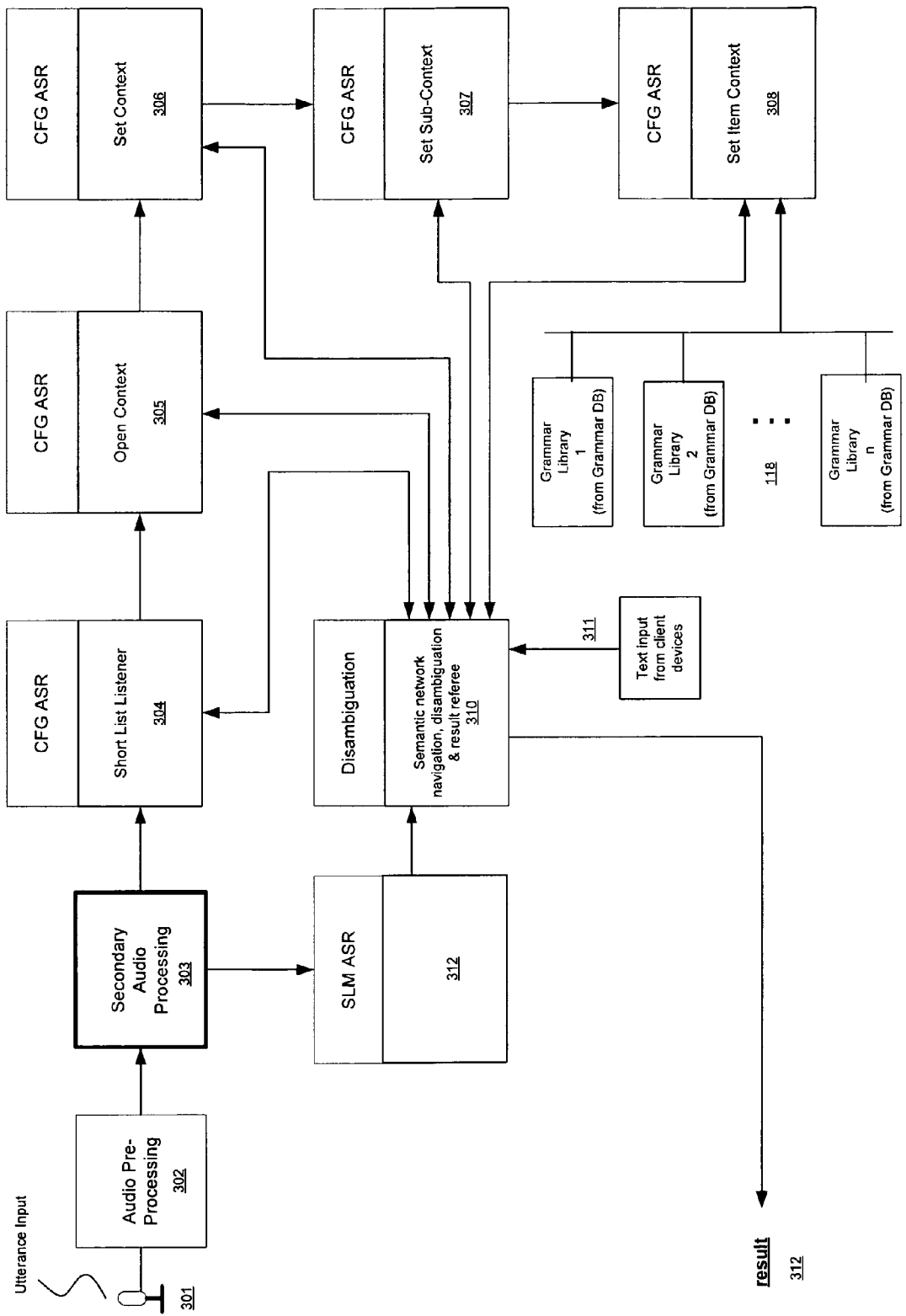
FIG. 3 is a flow diagram of a method for performing disambiguation of an information request, in accordance with an embodiment of the invention.

The media request is then queued and allocated to a next available processor module 210 for processing. The processor module 210 accepts the media request and is configurable to decode the media request through audio preprocessing (FIG. 4) and speech recognition using CFG ASR (FIG. 5) that is assisted by SLM ASR (FIG. 3). To assist in decoding the request, the processor module 210 is configurable to invoke the services of one or more other processor modules 210 in series or in parallel. Continuing the aforementioned example, a plurality of processor modules 210 may be dynamically enlisted approximately in parallel, each having dynamic access to various context grammar modules, to decode the media request for "Play the song 'Siempre Hay Esperanzia' by Sade." For instance, a first available processor module 210, accessing a general grammar module, is configurable to recognize the keyword 'song' using CFG ASR and thereby set the context of a second processor module 210 to music. The second next available processor module 210, now set in the context of music and accessing a music grammar module, is then configurable to recognize the keyword 'Sade' using CFG ASR and set the context of a third processor module 210 to music by Sade. The third next available processor module 210, now set in the context of music by Sade and accessing a music-by-Sade grammar module, is then configurable to recognize the keywords 'Siempre Hay Esperanzia' using CFG ASR. Additionally, one or more processor modules 210 is configurable to attempt, in series or approximately in parallel, to recognize one or more keywords of the media request through SLM ASR to supplement the recognition performed using CFG ASR. Accordingly, by way of speech recognition using CFG ASR and/or SLM ASR, a complex media request can be decoded without the problems inherent in processing such media request using traditional CFG ASR or SLM ASR alone.

Each processor module 210 is also configurable to invoke the services of support applications via the support application router 201. The support applications include an ASR grammar database 118, a metadata database 111, a consumer usage database 112, a recommendation engine 113, and a search engine 114. The ASR grammar database 118 contains grammar modules that are configurable to being dynamically available to the processor module 210 based on a defined context, consumer history, or consumer preferences. The grammar modules include a list of terminals, such as fewer than around 5,000 terminals. The metadata database 111 is configurable to provide information about available media, such as songs, images, music videos, podcasts, movies, television shows, or other similar media to the processor module 210. The metadata database 111 is updated periodically with available media via a data mining and metadata processor 110. The data mining and metadata processor 110 examines databases and files systems that contain media to be discoverable by the system and generates metadata for the media. The data mining and metadata processor 110 also receives metadata updates from a multiplicity of commercial and public sources known in the art. In addition, the data mining and metadata processor 110 generates derived metadata and generates relationships among the metadata items based on the primary metadata obtained from the aforementioned various sources. The consumer usage database 112 is configurable to retain records of consumer history and preferences for later recall and use. The recommendation engine 113 is configurable to create media playlists for the processor module 210. And, the search engine 114 is configurable to conduct traditional keyword searches for the processor module 210. Any of the aforementioned support applications can be combined, omitted, or supplemented with additional support applications.

Figure 9:
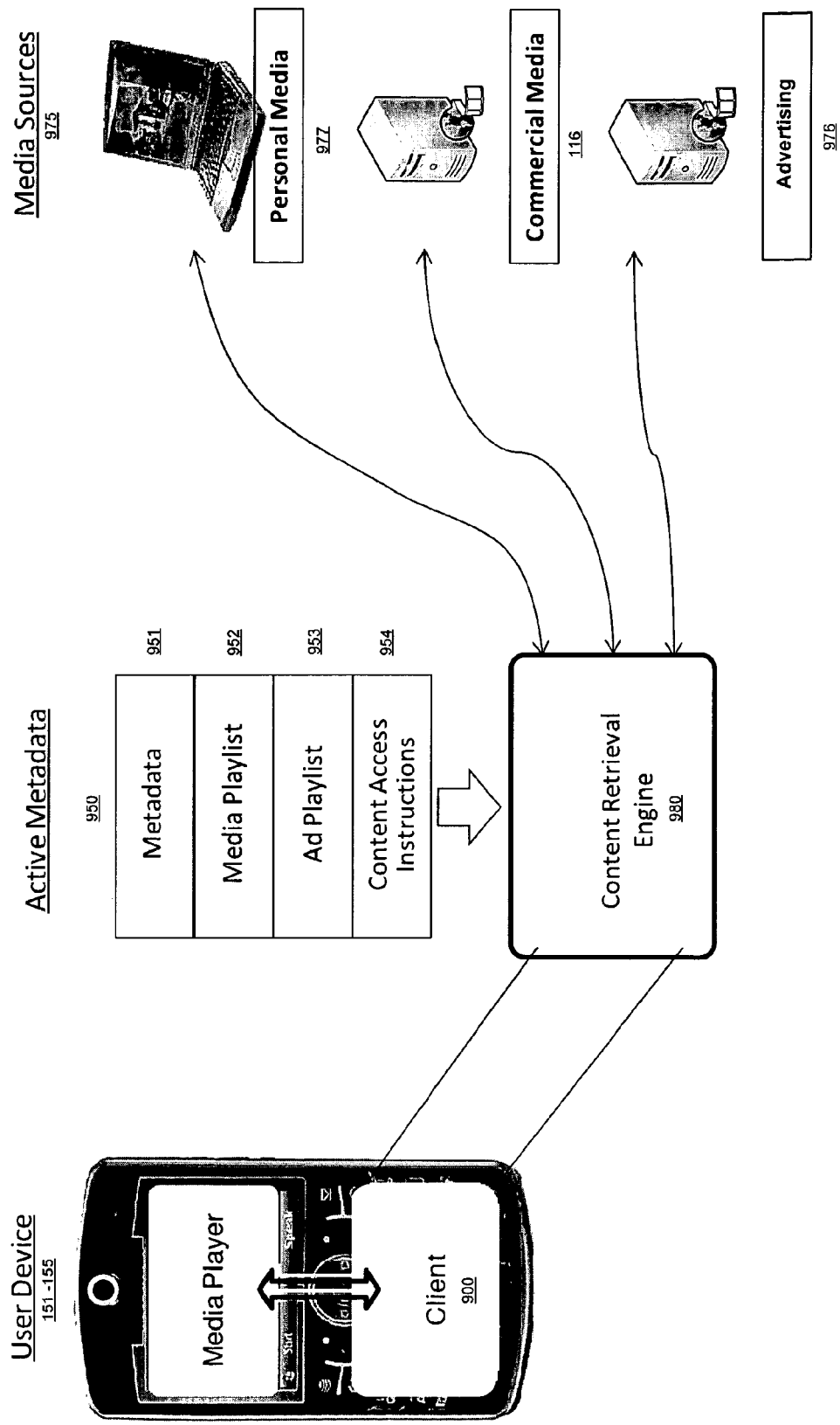
FIG. 9 is a system diagram of a consumer device utilizing delivered active metadata to retrieve media, in accordance with an embodiment of the invention.

Upon successful decoding of the media request, the processor module 210 prepares an active metadata response (FIG. 12) containing a reference to the media content, an optional sample of the media content, and access instructions for the media content. In one particular embodiment, the active metadata response further includes a login, password, or digital rights management codes for accessing the media. The processor module 210 then becomes available to serve another media request. The communications server 202 then communicates the active metadata response to the consumer device 152-155 or the phone 151 via the communications network 101 or the telephone network 102, respectively. In one particular embodiment, the active metadata response is delivered to the consumer device 152-155 or the phone 151 that initiated the media request. In other embodiments, the active metadata response is delivered to a different consumer device 152-155 or phone 151, which can be specified in the media request itself, as a user preference, or can be automatically determined. The consumer is then configurable to review the media referenced in the active metadata response and, if desired, directly access the media from media server 116, such as by pressing a button or a touch screen or otherwise manifesting intent. The media is then delivered to the consumer device 152-155 or phone 151 for consumption (FIG. 9). Alternatively, the active metadata response includes the media itself.

As referenced supra, the media request can include a request that the media be delivered to a consumer device 152-155 or phone 151 that is different from the consumer device 152-155 or phone 151 that initiates the media request.

For instance, the media request could be "Make a playlist that sounds like Celine Dion and send the result to my entertainment center". After decoding and fulfilling the media request, the communications server 202 can obtain destination instructions from the consumer usage database 112 or the consumer device 152-155 or phone 151 and deliver the active metadata response to the entertainment center for consumption.

Figure 2:
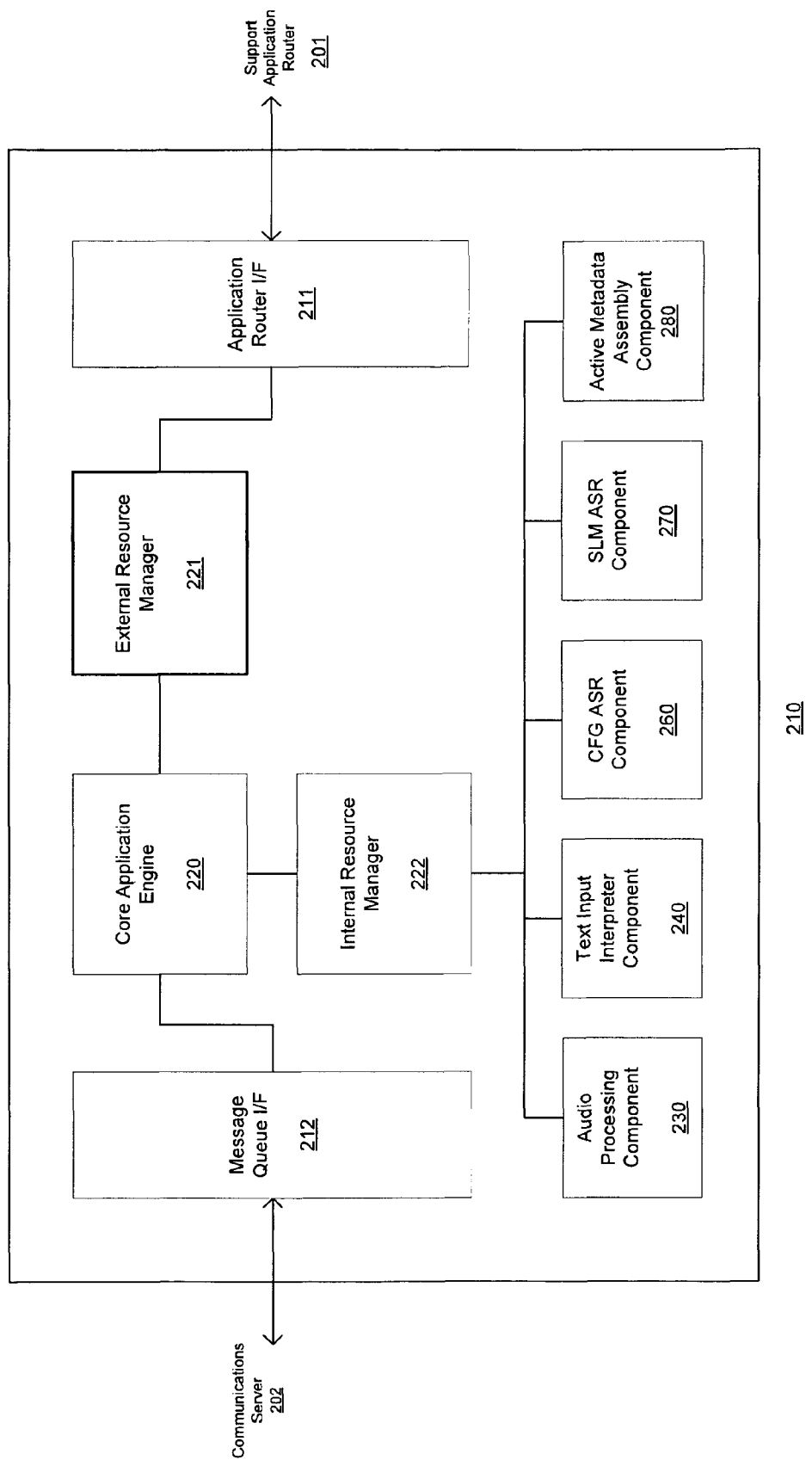
FIG. 2 is a system diagram of a processing module implemented in a multi-modal-consumer-input-based information discovery and retrieval system, in accordance with an embodiment of the invention.
Figure 5:
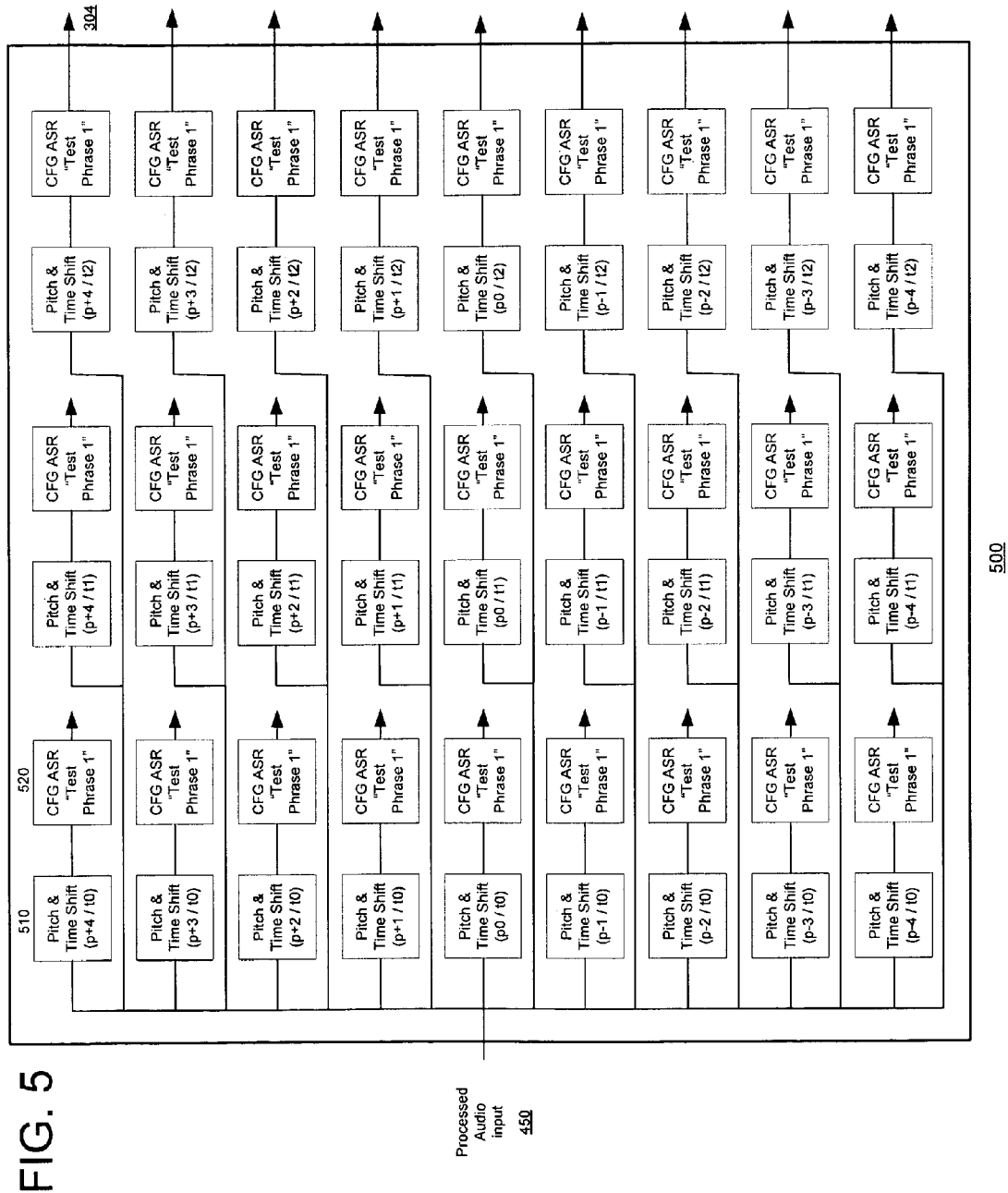
FIG. 5 is a flow diagram of a method for performing parallel audio analysis to determine audio processing parameters for enhancing speech recognition accuracy, in accordance with an embodiment of the invention.

FIG. 2 is a system diagram of a processing module implemented in a multi-modal-consumer-input-based information discovery and retrieval system, in accordance with an embodiment of the invention. The processor module 210 includes a message queue interface 212, a core application engine 220, an internal resource manager 222, an external resource manager 221, and an application router interface 211. The processor module 210 is configurable to receive media requests from the communications server 202, decode the media request, obtain references to media satisfying the media request, and return active metadata responses providing access to the media to the communications server 202 for delivery to a consumer. The core application engine 220 coordinates activities of the processor module 210 and manages the internal resource manager 222 and the external resource manager 221. The external resource manager 221 is configurable to invoke the services of support applications through an application router interface 211 via the support application router 201. The support applications include the ASR grammar database 118, the metadata database 111, the consumer usage database 112, the recommendation engine 113, and the search engine 114. Additionally, the external resource manager 221 is configurable to invoke via the support application router 201 the services of one or more additional processor modules 210. The internal resource manager 222 is configurable to communicate with sub-systems of the processor module 210, including an audio processing component 230, a text input interpreter component 240, a CFG ASR component 260, a SLF ASR component 270, and an active metadata assembly component 280. The sub-systems each perform specialized tasks for processing media requests for the processor module 210. For example, the audio processing component 230 is configurable to remove noise from a media request, detect media requests that are too loud, detect in coordination with the CFG ASR component 260 background speech in a media request (FIGS. 5 and 8), provide pitch or time stretch processing (FIG. 5), or some other similar function. The audio processing component 230 is also configurable to request support from one or more additional processor modules 210 to provide parallel pitch or time stretch processing (FIG. 5). The text interpreter component 240 is configurable to process text input contained within a media request. For example, the text interpreter component 240 can include multiple predicate recognition logic whereby letters of a word are used to recognize the word (e.g. 'm d'=Miles Davis or 'mil'=Miles Davis, Miley Cyrus, or Buddy Miles). The CFG ASR component 260 is configurable to accessing a grammar module that is dynamically assignable based upon a defined context. Any given grammar module includes a list of words or phrases (e.g. terminals) that are pertinent to a defined context. The CFG ASR component 260 is then configurable to perform speech recognition on the media request using CFG ASR to recognize a terminal contained within the dynamically assigned grammar module. The CFG ASR component 260 is also configurable to request support from one or more additional processor modules 210 to provide speech recognition. For instance, upon recognition of a terminal, the CFG ASR component 260 can request support from a second processor module 210 by providing a context for the recognized terminal and the media request. The second processor module 210 is then configurable to access a second grammar module for the context provided by the first processor module 210 and to performing speech recognition on the media request using CFG ASR to recognize another terminal contained within the second grammar module. Additional processor modules 210 can similarly support the first and second processor modules 210. The SLM ASR component 270 is configurable to perform speech recognition on the media request using SLM ASR to recognize a word or phrase. The active metadata assembly component 280 is configurable to prepare active metadata responses for delivery to the consumer containing references to the media requested. The media references are obtainable from the metadata database 111 using the media request as decoded by the CFG ASR or SLM ASR.

Figure 4:
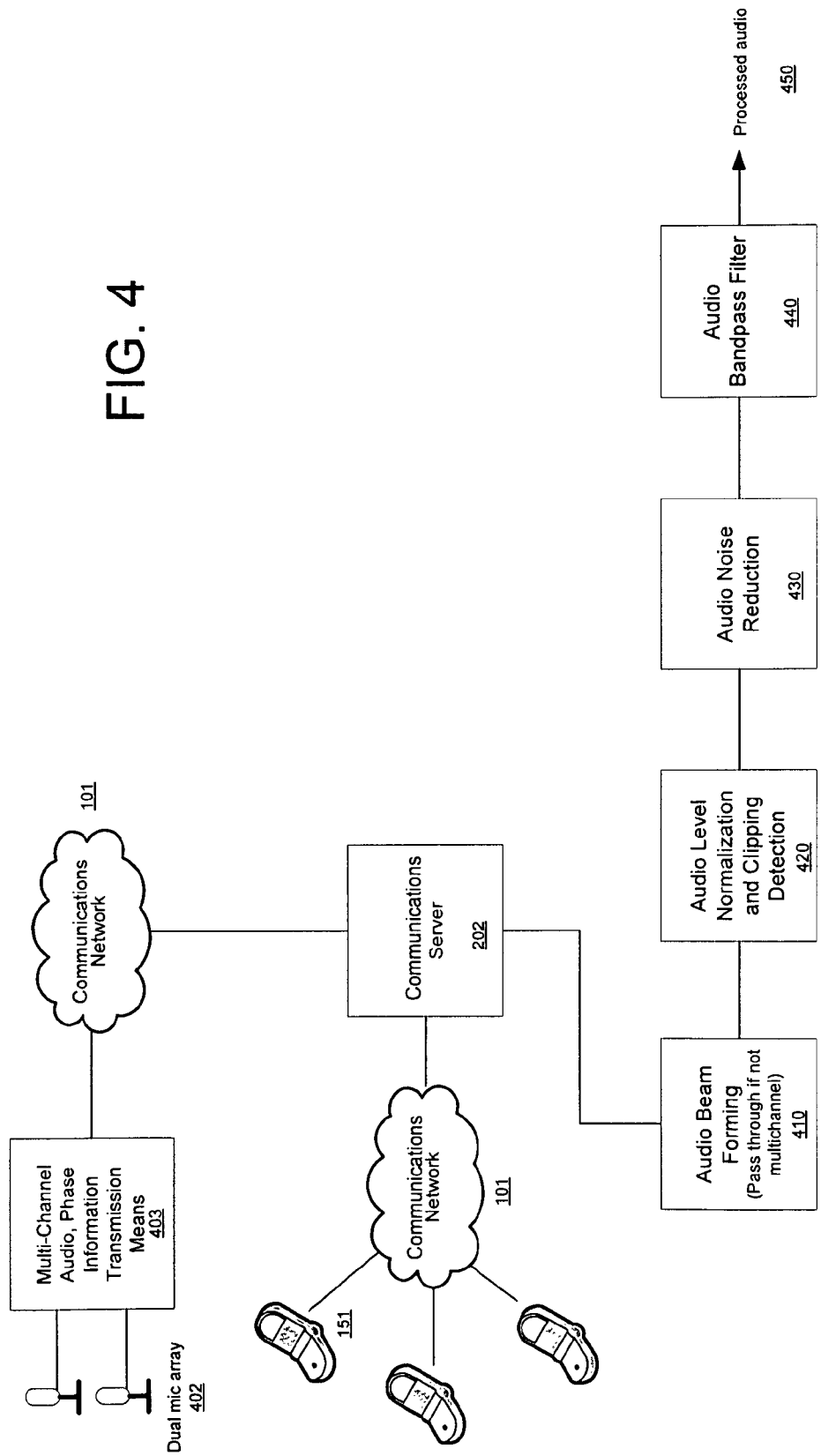
FIG. 4 is a flow diagram of a method for performing audio pre-processing, in accordance with an embodiment of the invention.

FIG. 3 is a flow diagram of a method for performing disambiguation of an information request, in accordance with an embodiment of the invention. In one embodiment, a media request is received at block 301. The media request is then processed by audio pre-processing at block 302 to remove noise, detect clipping, detect interfering speech, or to perform another similar function (FIG. 4). Upon completion of audio pre-processing, the media request is processed by secondary audio processing at block 303 to apply learned digital signal processing (DSP) as previously determined (FIG. 5) for performing pitch or time shifting or some other similar process to an utterance contained within the media request.

Next, CFG ASR is then performed on the media request at block 304 against a short list of terminals that represent frequently accessed media content or popular artists or media. If a short list terminal is recognized, instructions are prepared for communication to a consumer device to allow the consumer device to retrieve the media content. Otherwise, CFG ASR is then performed on the media request at block 305 against a general grammar module in order to recognize a terminal and to determine a first context of the media request. For example, with the media request "Play the song 'Siempre Hay Esperanzia' by Sade", the CFG ASR at block 305 would recognize the terminal "song" and set the first context of the media request to music. Next, CFG ASR is then performed on the media request at block 306 against the first context grammar module in order to recognize another terminal and to determine a second context of the media request. Continuing the example, with the media request "Play the song 'Siempre Hay Esperanzia' by Sade", the CFG ASR at block 306 performed against a music grammar module would recognize the terminal "play". Continuing the example further, the CFG ASR at block 307 performed against a music grammar module would recognize the terminal "Sade" and set the second context of the media request to be the artist named Sade. Next, CFG ASR is then performed on the media request at block 308 against the second context grammar module in order to recognize another terminal and to determine any third context of the media request. Continuing the example further, with the media request "Play the song 'Siempre Hay Esperanzia' by Sade", a Sade grammar module could include albums, songs, music videos, lyrics, or any other terminals related to Sade. Thus, the CFG ASR at block 308 performed against the Sade grammar module would recognize the terminal "Siempre Hay Esperanzia". This process can be performed in series or approximately in parallel and can continue as necessary depending on the media request. Also, SLM ASR can be performed on the media request at block 312 in series with or approximately in parallel with CFG ASR for supplementation or redundancy. Additionally, text input can be received at block 311 as a media request or to supplement, clarify, or refine a media request received at block 301.

The recognized terminals are then disambiguated at block 310 into decoded media requests. Disambiguation includes detecting recognition discrepancies between CFG ASR and SLM ASR and resolving those discrepancies through selecting a most probable terminal, repeating recognition steps, receiving consumer input, receiving a replacement media request, or other similar action. Additionally, disambiguation includes translating media requests that are ambiguous into more precise media requests. For example, a media request for "Play Mariah Carey's latest hit" would be translated into "Play Mariah Carey's Song Touch My Body" to reflect her current hit of "Touch My Body." Media is then discovered using the decoded media request and active metadata is prepared and communicated to a consumer device providing access instructions for retrieving the media.

Figure 8:
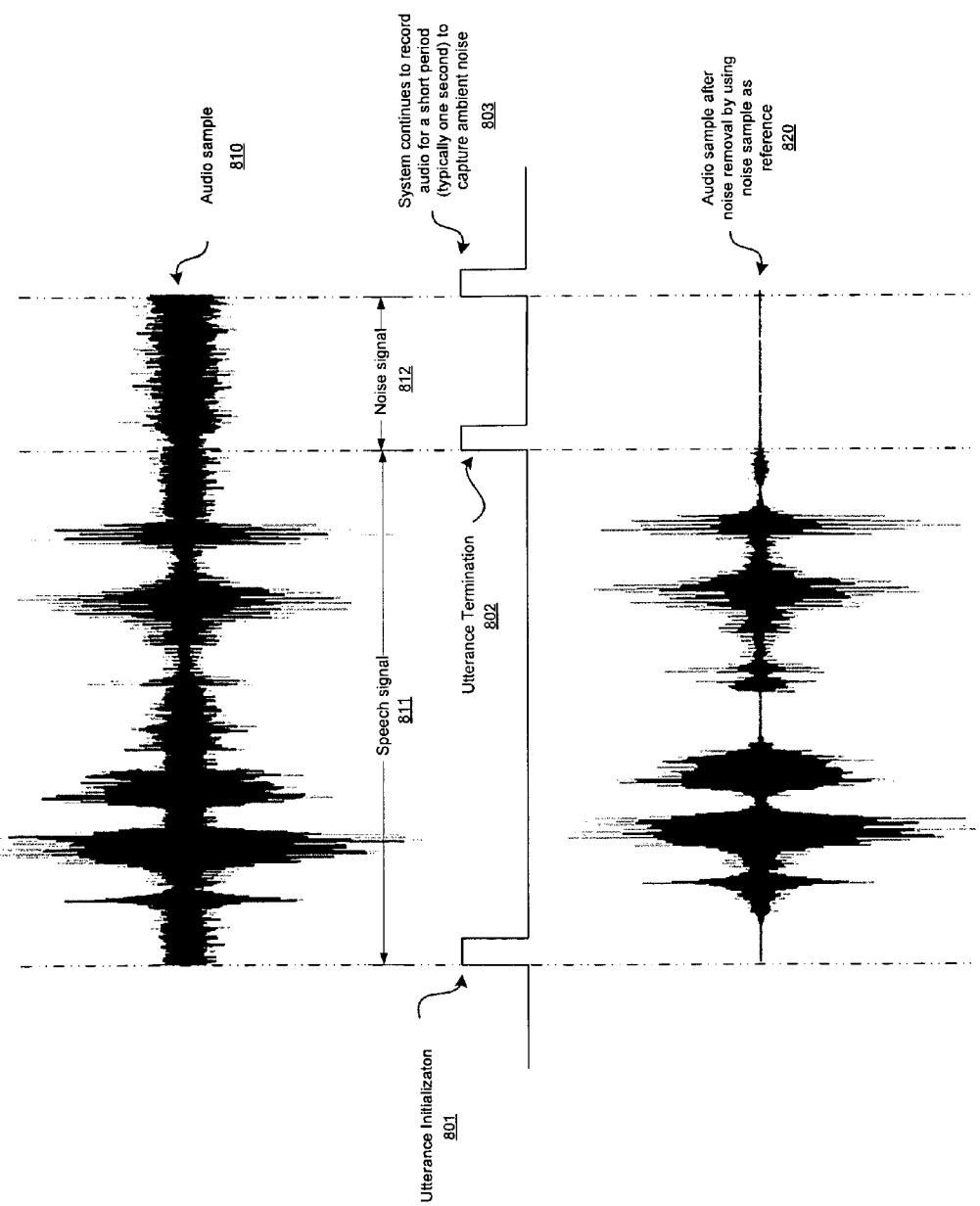
FIG. 8 is a data diagram illustrating a method for reducing noise from audio, in accordance with an embodiment of the invention.

FIG. 4 is a flow diagram of a method for performing audio pre-processing, in accordance with an embodiment of the invention. In one embodiment, digital audio containing a media request is received from a consumer device 151 or any microphone 402, including multiple microphones in an array, over a communications network 101 at a communications server 202. The digital audio also includes a sample of ambient noise received from the consumer device 151 (FIG. 8). If a multiple microphone array is utilized, the multiple sources of digital audio are processed by block 410 to perform beamforming to locate and focus the sensitivity of the array upon the desired speaker or reject audio from other and possibly interfering sources. If a single microphone is utilized, the digital audio signal of the single microphone is not further processed by block 410 but passes through unmodified to block 420. At block 420, the digital audio is normalized to an average level and clipping is detected. Audio noise reduction is then performed at block 430 using the sample of ambient noise contained in the digital audio as a reference, whereby noise similar to the ambient noise is removed from the digital audio. At block 440, the digital audio is band-limited to remove undesirable lower and upper frequency components and to match the acoustic model bandwidth of a speech recognition system.

FIG. 5 is a flow diagram of a method for performing parallel audio analysis to determine audio processing parameters for enhancing speech recognition accuracy, in accordance with an embodiment of the invention. In one embodiment, the method for performing parallel audio analysis includes receiving digital audio containing a test utterance from a consumer at block 450. The digital audio is distributed in parallel to a plurality of digital signal processing (DSP) modules 510. Each DSP module 510 is configurable to uniquely shift the pitch of the digital audio without modifying the duration and/or the duration of the digital audio without modifying the pitch by a predetermined amount and to communicate the shifted digital audio to a corresponding speech recognition system 520. One DSP module 510 preserves the original digital audio without any pitch or time shifting. Accordingly, the digital audio is incrementally shifted over a range of pitches (e.g. 50 Hz steps) and/or times (e.g. 10% steps) by a plurality of DSP modules 510 with each shifted digital audio being communicated to a corresponding speech recognition system 520. Each corresponding speech recognition system 520 attempts to recognize the test utterance contained in the shifted digital audio using ASR and outputs a confidence level 590 representing quality of recognition. The speech recognition system 520 having the highest confidence level 590 is identified along with the corresponding values of the pitch and time shift for that speech recognition system 520. The DSP modules 510 are then released into an available pool for receiving subsequent digital audio. The optimal pitch and time shift values are then storable for the consumer and automatically recallable to optimally adjust subsequent media requests by the consumer (FIG. 2, 230 and FIG. 3, 303). Accordingly, the parallel audio analysis processing may be performed during initial consumer setup or during each instance of media request.

Figure 6:
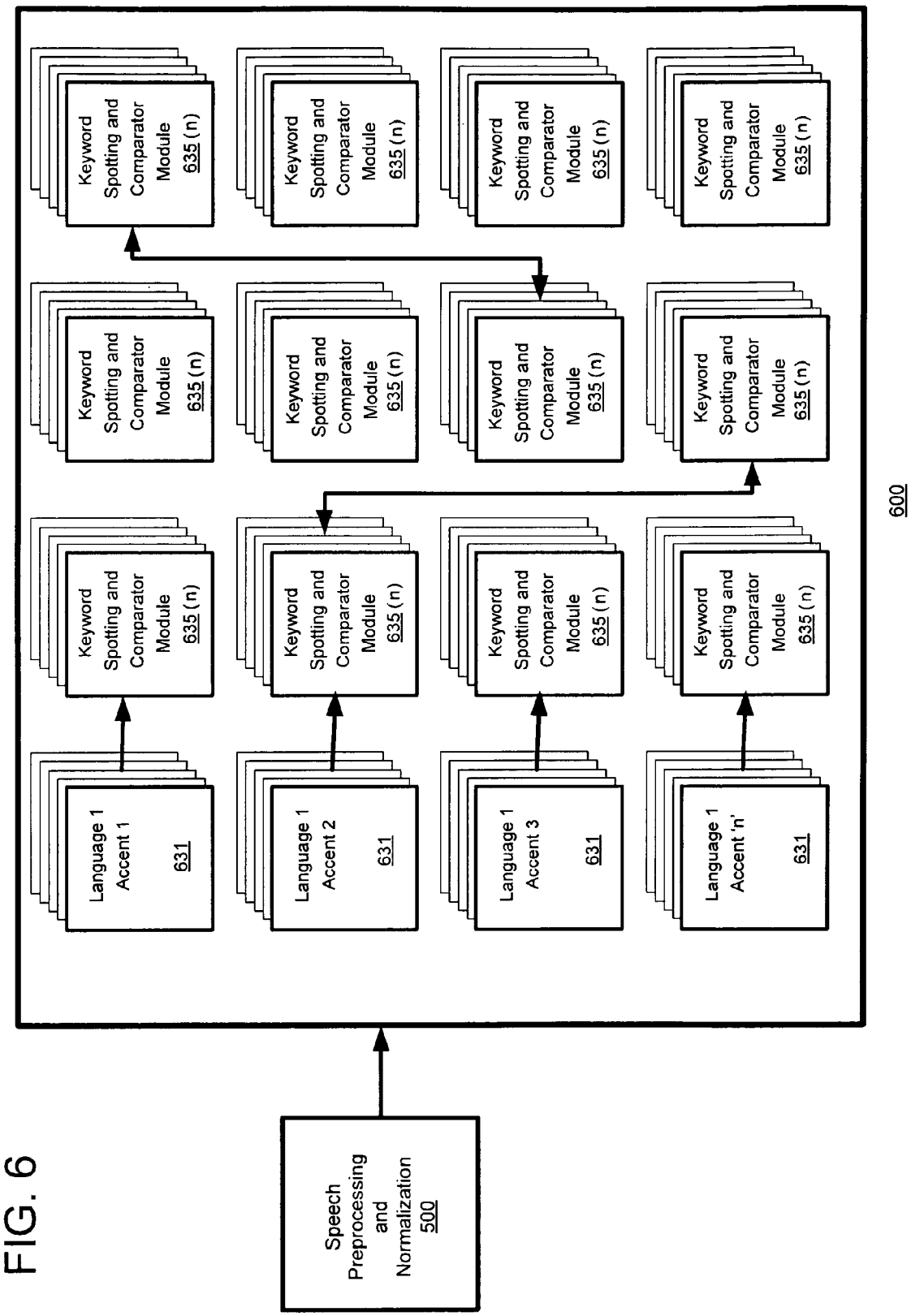
FIG. 6 is a flow diagram of a method for performing parallel speech analysis to determine language model matching for enhancing speech recognition accuracy, in accordance with an embodiment of the invention.

FIG. 6 is a flow diagram of a method for performing parallel speech analysis to determine language model matching for enhancing speech recognition accuracy, in accordance with an embodiment of the invention. In one embodiment, the method for performing parallel speech analysis includes receiving digital audio containing a test utterance from a consumer at block 500. The digital audio is distributed in parallel to a plurality of speech recognition systems 631. Each speech recognition system 631 is optimized to recognize speech having a unique accent or dialect for a given language (e.g. English with Chinese Accent or English with Southern accent). And, the speech recognition systems 631 can be optimized to recognize speech for a plurality of foreign languages. Each corresponding speech recognition system 631 then attempts to recognize the test utterance contained in the received digital audio using ASR and outputs a confidence level representing quality of recognition. The speech recognition system 631 having the highest confidence level is identified along with the corresponding identity of the accent, dialect, or language optimized for that speech recognition system 631. The accent, dialect, or language identity is then storable for the consumer and automatically recallable to optimally recognize subsequent media requests by the consumer. Accordingly, the parallel speech analysis may be performed during initial consumer setup or during each instance of media request.

Figure 7:
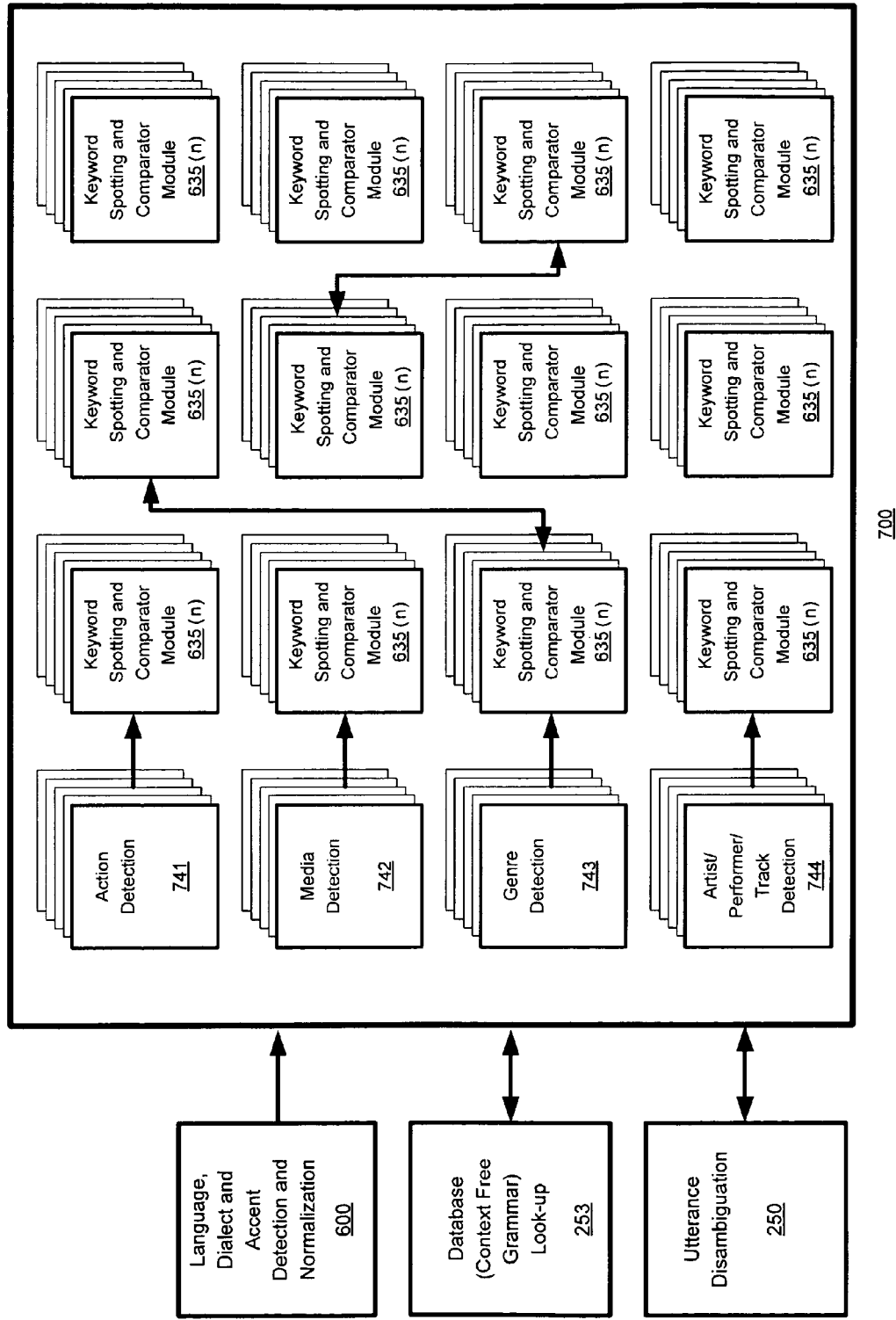
FIG. 7 is a flow diagram of a method for performing word-sense disambiguation of an information request, in accordance with an embodiment of the invention.

FIG. 7 is a flow diagram of a method for performing word-sense disambiguation of an information request, in accordance with an embodiment of the invention. FIG. 7 provides an additional perspective of the process illustrated and described with reference to FIG. 3.

FIG. 8 is a data diagram illustrating a method for reducing noise from audio, in accordance with an embodiment of the invention. In one embodiment, a consumer device begins receiving audio upon initialization by a consumer at 801. The consumer device then receives a speech signal 811 containing a media request uttered by the consumer. The consumer device then receives a termination indication from the consumer at 802. However, the consumer device continues receiving a noise signal 812 for specified period ending at 803. Accordingly, the consumer device receives audio containing the speech signal 811 and the noise signal 812 as illustrated in 810. Digital signal processing is then applied to remove the noise signal 812 from the speech signal 811 to render a clearer speech signal as illustrated in 820. Alternatively, the method can be used to detect excessively loud noise or third-party speech, which would be captured in the noise signal 812, and/or to deliver a recommendation to the consumer to move to a quieter location.

Figure 12:
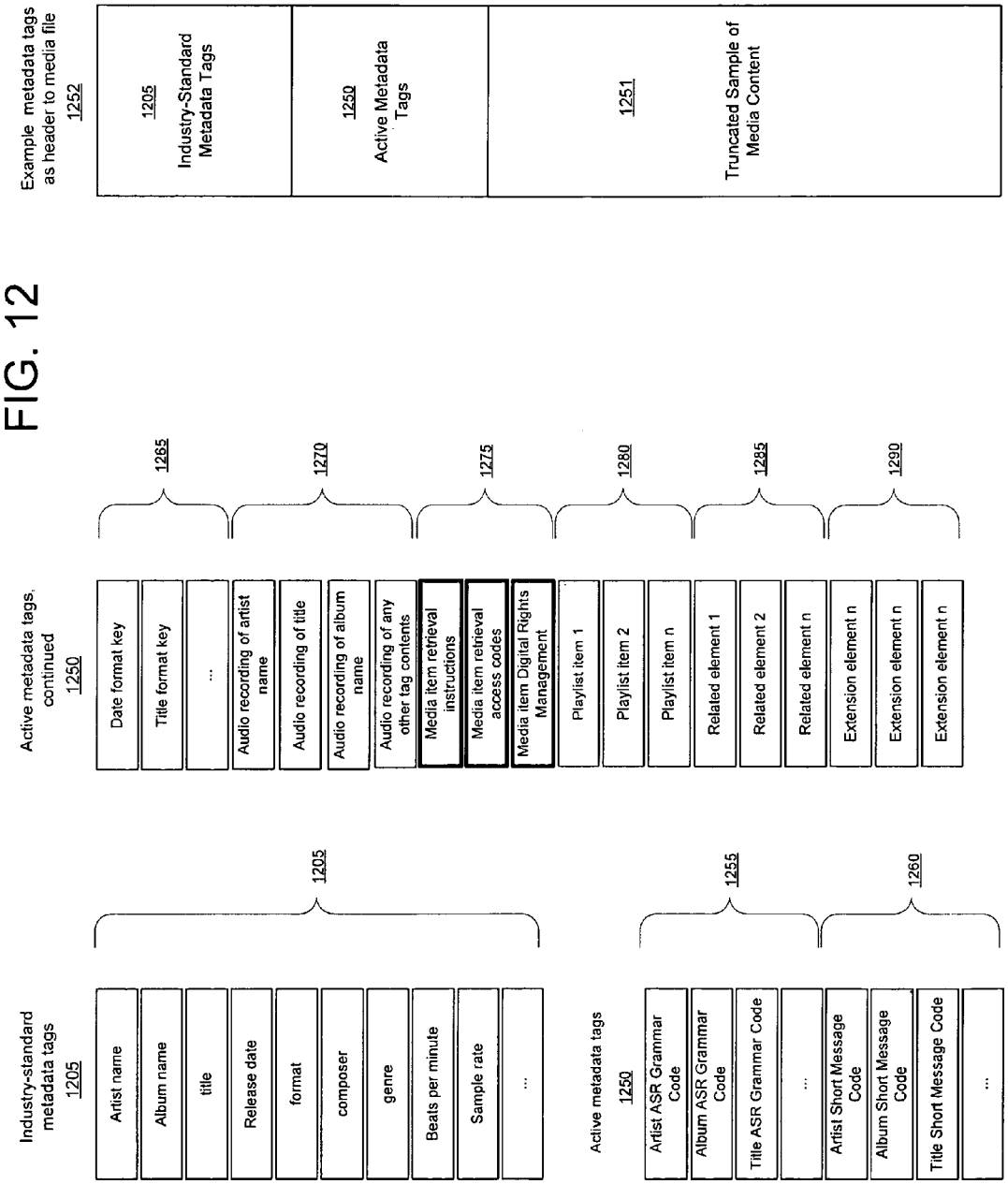
FIG. 12 is a visual depiction of industry standard metadata including active metadata, in accordance with an embodiment of the invention.

FIG. 9 is a system diagram of a consumer device utilizing delivered active metadata to retrieve media, in accordance with an embodiment of the invention. In one embodiment, the consumer device 151-155 includes a media player and a client 900 having a content retrieval engine 980. The client 900 is configurable to receive active metadata 950 as a result of a media request (FIG. 1). The active metadata 950 includes metadata 951, a media playlist 952, an ad playlist 953, and access instructions 954. Notably, in one embodiment, the active metadata 950 does not include media content itself, but instead includes information about the media content and instructions for accessing the media content if desired. Thus, the metadata 951 includes information native to media content as that supplied by a publisher. The media playlist 952 includes a list of media content and the ad playlist 953 includes a list of advertisements. The access instructions 954 include instructions for retrieving media content or advertisements from media sources 975, which include personal sources 977 and commercial sources 116 or 976. The access instructions 954 can include an Internet address, login information, password information, digital rights management keys or access codes, or other similar information. However, in one particular embodiment, the active metadata 950 does include a truncated version of the media content for initial consumer review (FIG. 12).

Upon receiving the active metadata 950, the client 900 is configurable to present the metadata 951, the media playlist 952, the add playlist 953, and any truncated version of the media content using the media player. Because the active metadata 950 appears to be an ordinary media file having a format and type as expected by a traditional media player, an existing media player on the consumer device 151-155 is usable. Therefore, the media playlist 952 and the metadata 951 are reviewable along with any truncated versions of the media content. When media content is desired, the content retrieval engine 980 utilizes the access instructions 954 of the active metadata 950 to retrieve the media content and any advertisements from the media sources 975. In one particular embodiment, the truncated version of the media content on the consumer device 151-155 is initially presented while the media content is retrieved from the media sources 975 and the retrieved media content is then presented upon termination of the truncated version, thereby facilitating a seamless presentation of the media content on the consumer device 151-155.

Figure 10:
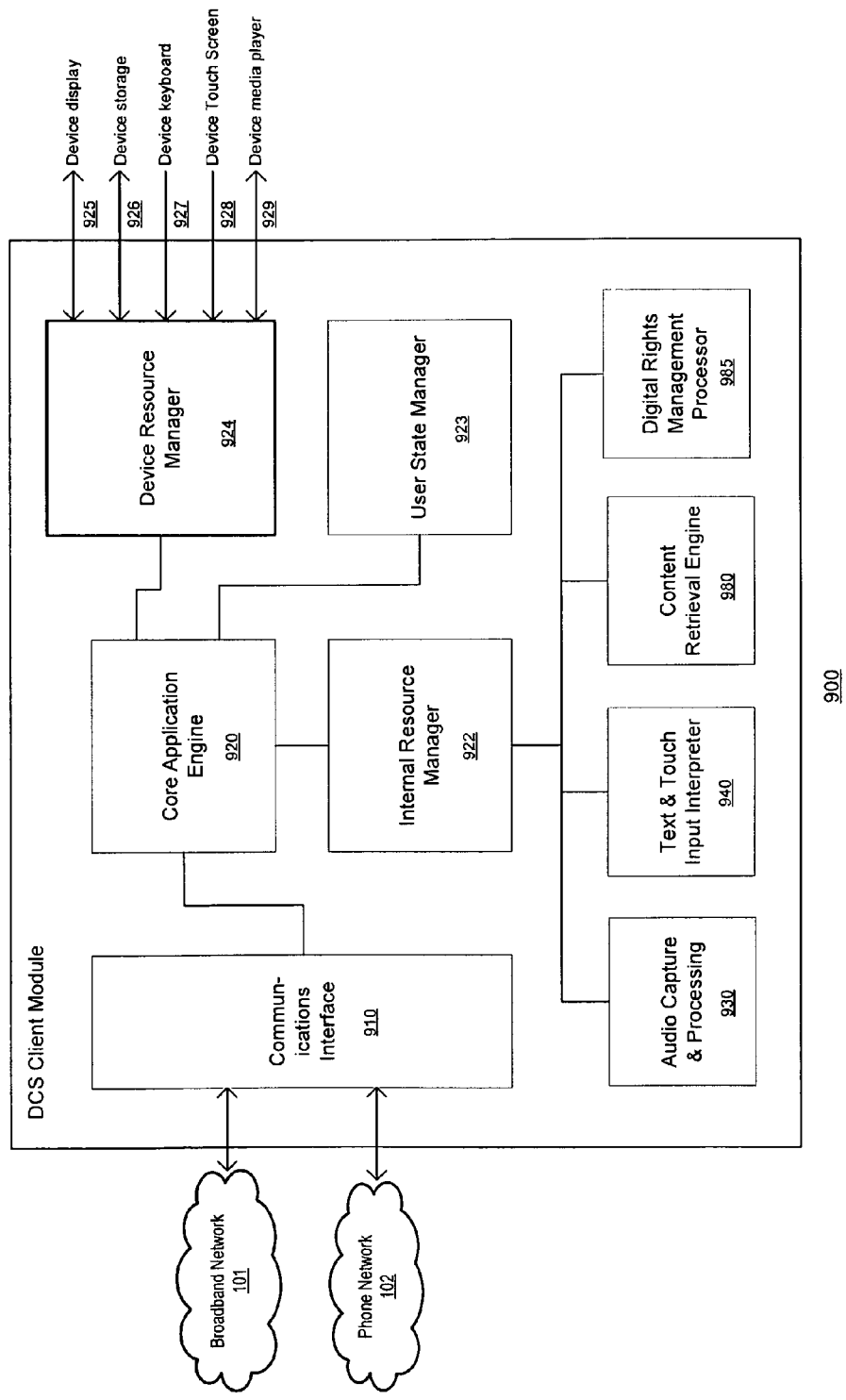
FIG. 10 is a system diagram of a client software application for use in a multi-modal-consumer-input-based information discovery and retrieval system, in accordance with an embodiment of the invention.

FIG. 10 is a system diagram of a client software application for use in a multi-modal-consumer-input-based information discovery and retrieval system, in accordance with an embodiment of the invention. The client software application is configurable implement various embodiments described in reference to FIG. 9 supra.

Figure 11:
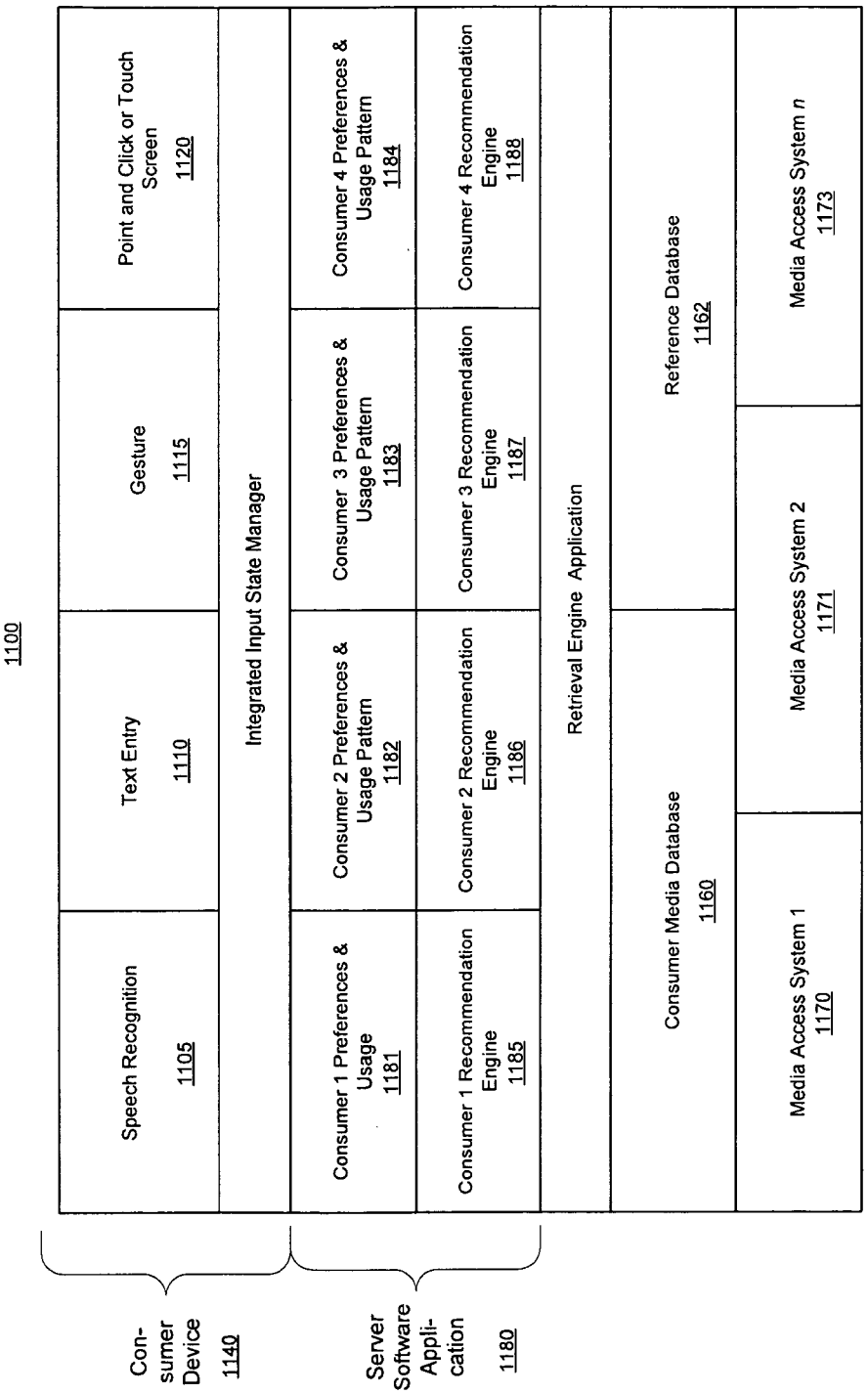
FIG. 11 is a chart illustrating service layers of a multi-modal-consumer-input-based information discovery and retrieval system, in accordance with an embodiment of the invention.

FIG. 11 is a chart illustrating service layers of a multi-modal-consumer-input-based information discovery and retrieval system, in accordance with an embodiment of the invention. In one embodiment, a media request is received by a consumer device 1140. The media request is communicated to a server software application 1150 that accesses consumer specific preferences and usage patterns to assist in decoding the media request. The decoded media request is fulfilled by accessing consumer and commercial media reference databases 1160 and 1162 and returning to the consumer device 1140 active metadata. The consumer database 1160 can include media references for media content on the consumer device generating the media request or on a plurality of consumer devices different from the consumer device generating the media request, which may be owned by different consumers. The commercial reference database 1162 includes media references for media content on any computer other than a consumer device. The active metadata is used by the consumer device 1140 or a different consumer device to access and retrieve media content over local or wide area networks 1170 or 1171, which may be streamed. In one particular embodiment, the consumer device 1140 includes a multi-modal user interface including speech recognition, text entry, gesture sensing, and a point/click or touch screen. In another particular embodiment, the server software application 1180 is configurable to enable multiple consumer use of a single consumer device. Different preferences, usage patterns, and recommendations are tracked and applied for each of the consumers.

FIG. 12 is a visual depiction of industry standard metadata including active metadata, in accordance with an embodiment of the invention. In one embodiment, metadata 1252 include industry standard metadata 1205, active metadata 1250, and truncated media content 1251 for reviewing and retrieving media content on a consumer device. The metadata 1252 is returned to a consumer device as a result of a media request (FIG. 1). The industry standard metadata 1205, such as industry standard metadata ID3 as used for media storage files such as MP3 or MP4, can include artist name, album name, title, release date, format, composer, genre, beats per minute, sample rate, and others. This metadata includes fields that are typically included by media publishers for the media content and read by media playback systems such as those found in consumer devices. The active metadata 1250 can be added to the industry standard metadata 1205 and can include ASR grammar codes 1255; short text string matching codes 1260; information formatting codes 1265 for formatting a consumer device display; embedded audio recordings 1270 for providing an audible representation of data contained in the standard metadata 1205 or active metadata 1250 such as for confirmation, safety, or educational purposes; access instructions 1275 for automatically retrieving upon request the media content referenced by the active metadata 1250, such as a URL, URI, login, password, digital rights management access keys, or digital rights management rules regarding sharing or copying; playlist items 1280 for providing a list of related media content such as those to be sequentially presented with the media content; miscellaneous information 1285 such as an artist biography, graphics, or lyrics related to the media content; and extension information 1290 for references to or access instructions for information that would otherwise overflow formatting limits of the tags such as a music video performance for a song type of media content. The truncated media content 1251 can include the media content itself or a truncated version of the media content. The truncated version of the media content can be a 'trailer' for marketing purposes, a short section to aid in identifying the media content such as through time and frequency domain matching, or as an initial segment of the media content for initial playback while access to the complete media content is performed.

Figure 13:
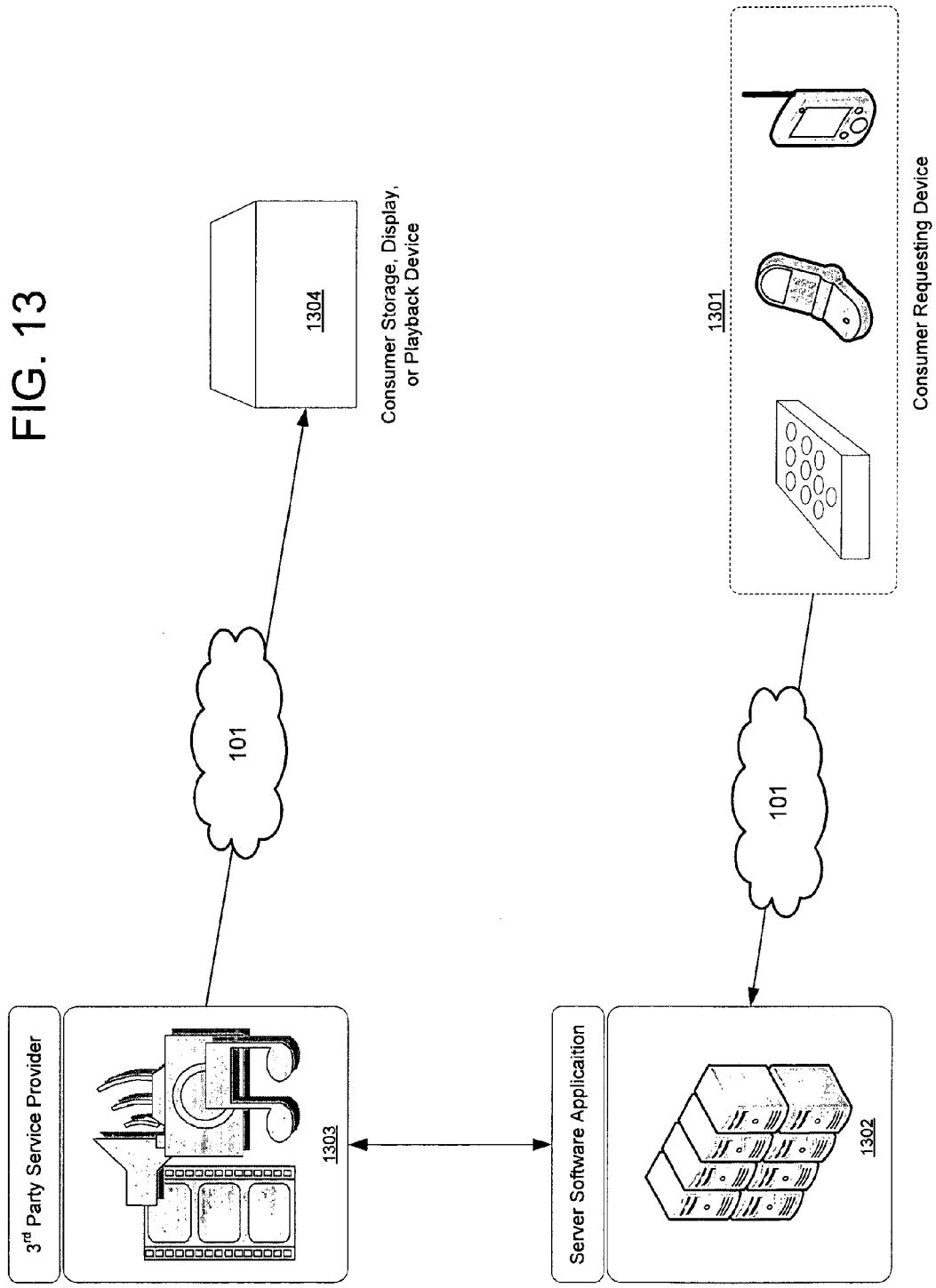
FIG. 13 is a system diagram of a multi-modal-consumer-input-based information discovery and retrieval system facilitating information requests from one consumer device for display on another consumer device, in accordance with an embodiment of the invention.

FIG. 13 is a system diagram of a multi-modal-consumer-input-based information discovery and retrieval system facilitating information requests from one consumer device for display on another consumer device, in accordance with an embodiment of the invention. In one embodiment, a consumer device 1301 is configurable to receive a media request and communicate the media request to a server software application 1302 that decodes the media request (FIG. 1). The server software application 1302 uses the decoded media request to prepare active metadata for retrieving the media content and communicates the active metadata to a third party service provider 1303, such as a cable provider. The identity of the third party service provider 1303 can be included in the media request or can be based on stored consumer preferences. The third party service provider 1303 then uses the active metadata to retrieve the media content and communicate the media content to a consumer device 1304 for presentation, which is different from the consumer device 1301. Accordingly, a consumer can utter a media request for "Let's see the first Star Wars movie." The media request can be received by a remote control device and communicated to the server software application. The server software application can decode the media request, prepare active metadata for accessing the first Star Wars movie, identify from consumer preferences the third party service provider, and communicate the active metadata to the third party service provider. The third party service provider can then retrieve the first Star Wars movie and communicate such to the consumer's cable box for viewing.

In another embodiment, the server software application 1304 can communicate the active metadata directly to the consumer device 1304, which can be specified in the media request or obtained from stored consumer preferences. In a related embodiment, the server software application 1304 can communicate active metadata directly to the consumer device 1304 that is configurable to retrieve media content from a different consumer device than that receiving the media request. For example, a consumer can utter a media request for "Display pictures from my trip to Europe located on my home computer on my digital frame". The media request can be received by a personal digital assistant and communicated to the server software application. The server software application can decode the media request, identify from consumer preferences the home computer and digital frame network address, prepare active metadata for accessing the pictures from the home computer, and communicate the active metadata to the digital frame. The digital frame can then retrieve the pictures from the home computer and present them for viewing. Indeed other media requests can be as follows: "Put the picture of the girls riding horses at camp last summer on my office picture frame"; "Display pictures of our trip to Mexico last spring in the family room"; or "Send pictures from my trip to Arizona to Frank's email."

In one embodiment, the system takes a misspelling contained within a media request and translates it into a phonetic transcription.

In another embodiment, the system provides a grammar module containing a short list of terminals based upon the context of a previous media request. The context of a previous media request can be retained for a predetermined period of time or until another action supersedes the context. For example, a media request for "Show me my Miles Davis albums" would result in a list of Miles Davis albums. A follow up media request for "Play Kind of Blue" or "K O B" would result in recognition of Kind of Blue by Miles Davis because the grammar module contained terminals related to the context of Miles Davis albums as previous requested. As another example, a media request for "Show me Eagles Albums" would result in a list of Eagles albums. A follow up media request for "Play Greatest Hits" or "G H" would result in recognition of greatest hits by the Eagles because the grammar module contained terminals related to the context of Eagles albums as previously requested. Another example would be a media request for "Play KIIS FM" followed up by a media request for "Remove the Rap" followed up by a media request for "Add some Mariah Carey", which would result in a radio station playing without rap and with Mariah Carey music intermittently added.

In another embodiment, the system customizes terminals of a grammar module based on voice or textual spelling of a term. For example, a media request for music by an obscure garage band may require that the consumer provide a spelling of a term or terms within the media request. The spelled term or terms are then used to provide a more focused list of terminals within a grammar module for speech recognition purposes.

In yet a further embodiment, the system repeats the process for decoding a media request using different grammar modules, filters, or signal processing after an unsuccessful attempt.

In an alternative embodiment, the system prioritizes a confidence level associated with a particular identified terminal depending on the consequences of acting upon it. For example, misunderstanding an artist name would be more acceptable than turning up the volume to far through a misinterpretation of a device operation command.

In an additional embodiment, the system facilitating speech recognition training using pervious voice samples within a constrained grammar module or modules.

In another embodiment, the system establishes filters through consumer usage for identifying media content of typical interest and prioritizing such content by relevance and size. The filters can be established automatically or by or with the aid of human intervention, such as playlists for particular musical styles as compiled by professional DJs. The filters can refined continuously depending on variables such as a confidence of the level of interest, frequency of consumption, or a consumer rating value.

In yet a further embodiment, the consumer device is specifically adapted for usage with the server software application (FIG. 1) and may have attributes similar to that of the iPOD® by APPLE®.

In yet another embodiment, the system employs a plurality of industry standard or proprietary speech recognition systems.

In a further embodiment, the system establishes a virtual directory of available media for which local and remote media is mapped thereby allowing access to media from a plurality of possibly disparate locations without requiring that a media request specifically identify that location.

In a different embodiment, the system establishes a media asset "finger print" unique identifier, whereby the finger print includes media attributes such as music, tempo, pitch range, file name, file length, file size, creation date or time, network location, or other similar identifiers. The finger print can be used to establish the virtual directory of available media.

In an additional embodiment, the system establishes a grammar module using XML containing the terminals.

In yet an additional embodiment, the system includes a resource management system to dynamically configure the resources that are dynamically assigned for each received media request to optimize the amount of server processing power required to support the media request.

In another embodiment, the system provides a virtual environment for each consumer device and media request that consumes small resources and while a consumer device is inactive and that expands to consume up to all available resources while a consumer device is active.

In a further embodiment, the system creates relationships among media content such as artists' songs using a graphical representation of a media database based on genre (and sub-genre) labels. A graph is generated based on frequency of occurrence of each genre type which defines a diameter of a circle representing the genre. A thickness of the circumference of the circle represents a frequency for which the genre is accessed by a consumer. Relationships between artists or between different titles by artists can be graphed based on trigonometric identities plotted by calculating circumference and thickness of circumference where thickness represents inertia of the system to exit that genre type and transition to another genre type. The system can plot relationships between artists or relationships between songs based on a single consumer's habits or a large or small group of consumers or a combination of the foregoing.

In an alternative embodiment, the system provides for matching utterances with existing metadata using tag clouds. In a related embodiment, the system provides for matching utterances with existing metadata using probabilistic matching based on prior successful matches, prior consumer usage, rules derived from a representative ontology (for music, podcasts, photos, videos, etc), or rules derived from fuzzy logic evaluation systems.

In a further embodiment, the system provides for combining active tags with industry standard tags associated with media content to establish active metadata, whereby the active tags include speech recognition grammar fields or short-text matching fields for use with recalling the media content.

In an additional embodiment, the system provides training for open grammar recognition while processing constrained grammar recognition. The constrained grammar recognition provides known pattern matches that can be used for training the open grammar recognition. Accordingly, while a consumer is initially using the system, utterances contained within media requests are applied to open grammar recognition along with a result from the constrained grammar recognition. With continued usage, the open grammar recognition is improved.

In a further embodiment, the system provides a context manager application that directs media requests to the ASR with a context appropriate grammar module. The context manager application reduces false positives that could occur when a plurality of grammar modules are simultaneously applied to a media request. In a related embodiment, successful speech recognition results are fed back to the context manager application, which then further directs media requests based on past successes.

In another embodiment, the system provides for creating a new grammar module from terminals previously recognized.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method, comprising:
   receiving, at a communications server, an utterance, the utterance received from a consumer device via a transmission received by the communications server at least partially via the Internet;
   invoking at least two speech recognition modules, the at least two speech recognition modules associated with at least two languages, the invoking at least two speech recognition modules causing the at least two speech recognition modules each to determine a confidence value associated with independently recognizing at least a first portion of the utterance;
   selecting a language at least partially based on at least two determined confidence values resulting from the at least two speech recognition modules independently recognizing the at least a first portion of the utterance;
   invoking at least two speech recognition modules associated with at least two dialects or at least two accents at least partially based on the selected language, the invoking at least two speech recognition modules causing the at least two speech recognition modules each to determine a confidence value associated with independently recognizing at least a second portion of the utterance;
   selecting at least one of a dialect or an accent at least partially based on at least two determined confidence values resulting from the at least two speech recognition modules independently recognizing the at least a second portion of the utterance;
   invoking a single speech recognition module at least partially based on (i) the selected language and (ii) the selected dialect or accent, the invoking a single speech recognition module operable to cause the single speech recognition module to recognize at least a third portion of the utterance; and
   decoding the utterance at least partially based on the recognized third portion of the utterance,
   wherein the speech recognition modules are at least partially implemented using at least one processing device coupled with the communications server.

2. The method of claim 1, further comprising:
   discovering at least some information at least partially based on the decoded utterance;
   preparing one or more instructions associated with accessing the discovered at least some information; and
   providing the prepared one or more instructions.

3. The method of claim 1, wherein receiving, at a communication server, an utterance, the utterance received from a consumer device via a transmission received by the communications server at least partially via the Internet comprises:
   receiving the utterance; and
   verifying an identity of a consumer associated with the utterance at least partially via the communications server.

4. The method of claim 3, wherein verifying an identity of a consumer associated with the utterance at least partially via the communications server comprises:
   verifying the identity at least partially via a consumer support system.

5. The method of claim 3, wherein verifying an identity of a consumer associated with the utterance at least partially via the communications server comprises:
   verifying the identity at least partially via a consumer support system, including at least accessing a consumer usage database to retrieve at least one of speech pattern characteristics, usage history, or preferences associated with the consumer.

6. The method of claim 3, wherein verifying an identity of a consumer associated with the utterance at least partially via the communications server comprises:
   verifying the identity at least partially based on at least one prior decoding of a test utterance associated with the consumer during an initial consumer setup.

7. The method of claim 6, wherein verifying the identity at least partially based on at least one prior decoding of a test utterance associated with the consumer during an initial consumer setup comprises:
   verifying the identity at least partially based the consumer setup, the consumer setup including at least storing at least some data related to at least one of language, accent, or dialect and the consumer.

8. The method of claim 1, wherein selecting a language at least partially based on at least two determined confidence values resulting from the at least two speech recognition modules independently recognizing the at least a first portion of the utterance comprises:
   selecting the language at least partially based on the at least two confidence values, including at least prioritizing the two or more confidence values at least partially based on one or more consequences associated with acting on the at least a first portion of the utterance.

9. The method of claim 1, wherein selecting at least one of a dialect or an accent at least partially based on at least two determined confidence values resulting from the at least two speech recognition modules independently recognizing the at least a second portion of the utterance comprises:
selecting the at least one of a dialect or an accent at least partially based on the at least two confidence values, including at least prioritizing the one or more confidence values at least partially based on one or more consequences associated with acting on the at least a second portion of the utterance.

10. The method of claim 1, further comprising:
deallocating at least one invoked selected speech recognition module.

11. The method of claim 1, further comprising:
storing at least some data associated with the utterance, the selected language, and the selected accent or dialect, the storing at least some data operable to train at least one open-word speech recognition system to understand a speaker of the utterance.

12. The method of claim 1, wherein selecting at least one of a dialect or an accent at least partially based on at least two determined confidence values resulting from the at least two speech recognition modules independently recognizing the at least a second portion of the utterance comprises:
providing an indication of a selected interpretation, the selected interpretation at least partially based on the selected language and the selected dialect or accent.

13. The method of claim 1, wherein receiving, at a communications server, an utterance, the utterance received from a consumer device via a transmission received by the communications server at least partially via the Internet comprises:
receiving the utterance, the utterance including one or more of at least some audible speech, at least one spoken word, at least some motion communication, at least some textual communication, or at least one graphical user interface interaction.

14. The method of claim 1, wherein receiving, at a communications server, an utterance, the utterance received from a consumer device via a transmission received by the communications server at least partially via the Internet comprises:
receiving the utterance, the utterance associated with capture by one or more of at least one mobile phone, at least one personal computer, at least one laptop computer, at least one personal digital assistant, at least one smart phone, at least one music player, at least one television, at least one radio, at least one game console, at least one video recorder, at least one entertainment center, or at least one remote control.

15. A system, comprising:
circuitry configured for receiving an utterance, the utterance received from a consumer device via a transmission at least partially via the Internet;
circuitry configured for invoking at least two speech recognition modules, the at least two speech recognition modules associated with at least two languages, the invoking at least two speech recognition modules each to determine a confidence value associated with independently recognizing at least a first portion of the utterance;
circuitry configured for selecting a language at least partially based on at least two determined confidence values resulting from the at least two speech recognition modules independently recognizing the at least a first portion of the utterance;
circuitry configured for invoking at least two speech recognition modules associated with at least two dialects or at least two accents at least partially based on the selected language, the invoking at least two speech recognition modules causing the at least two speech recognition modules each to determine a confidence value associated with independently recognizing at least a second portion of the utterance;
circuitry configured for selecting at least one of a dialect or an accent at least partially based on at least two determined confidence values resulting from the at least two speech recognition modules independently recognizing the at least a second portion of the utterance;
circuitry configured for invoking a single speech recognition module at least partially based on (i) the selected language and (ii) the selected dialect or accent, the invoking a single speech recognition module operable to cause the single speech recognition module to recognize at least a third portion of the utterance; and
circuitry configured for decoding the utterance at least partially based on the recognized third portion of the utterance,
wherein the circuitry is at least partially effected in a communications server receiving the utterance.

16. The system of claim 15, further comprising:
circuitry configured for discovering at least some information at least partially based on the decoded utterance;
circuitry configured for preparing one or more instructions associated with accessing the discovered at least some information; and
circuitry configured for providing the prepared one or more instructions.

17. The system of claim 15, wherein circuitry configured for receiving an utterance, the utterance received from a consumer device via a transmission at least partially via the Internet comprises:
circuitry configured for verifying an identity of a consumer associated with the utterance at least partially via the communications server.

18. A computer program product, comprising:
at least one non-transitory computer-readable medium including at least:
one or more instructions for receiving, at a communications server, an utterance, the utterance received from a consumer device via a transmission received by the communications server at least partially via the Internet;
one or more instructions for invoking at least two speech recognition modules, the at least two speech recognition modules associated with at least two languages, the invoking at least two speech recognition modules causing the at least two speech recognition modules each to determine a confidence value associated with independently recognizing at least a first portion of the utterance;
one or more instructions for selecting a language at least partially based on at least two determined confidence values resulting from the at least two speech recognition modules independently recognizing the at least a first portion of the utterance;
one or more instructions for invoking at least two speech recognition modules associated with at least two dialects or at least two accents at least partially based on the selected language, the invoking at least two speech recognition modules causing the at least two speech recognition modules each to determine a confidence value associated with independently recognizing at least a second portion of the utterance;

one or more instructions for selecting at least one of a dialect or an accent at least partially based on at least two determined confidence values resulting from the at least two speech recognition modules independently recognizing the at least a second portion of the utterance;

one or more instructions for invoking a single speech recognition module at least partially based on (i) the selected language and (ii) the selected dialect or accent, the invoking a single speech recognition module operable to cause the single speech recognition module to recognize at least a third portion of the utterance; and one or more instructions for decoding the utterance at least partially based on the recognized third portion of the utterance.

19. The computer program product of claim 18, wherein the at least one non-transitory computer-readable medium comprises:

one or more instructions for discovering at least some information at least partially based on the decoded utterance;

one or more instructions for preparing at least an indication associated with accessing the discovered at least some information; and one or more instructions for providing the prepared at least an indication.

20. The computer program product of claim 18, wherein at least some of the one or more instructions for receiving an utterance, the utterance received from a consumer device via a transmission at least partially via the Internet, comprise:

one or more instructions for verifying an identity of a consumer associated with the utterance at least partially via the communications server.

\* \* \* \* \*